US005644730A

United States Patent [19]
Fayfield

[11] Patent Number: 5,644,730
[45] Date of Patent: Jul. 1, 1997

[54] DUAL MODE BINARY SENSOR FOR BUS OPERATION

[75] Inventor: Robert W. Fayfield, Shorewood, Minn.

[73] Assignee: Banner Engineering Corp., Minneapolis, Minn.

[21] Appl. No.: 409,262

[22] Filed: Mar. 22, 1995

[51] Int. Cl.⁶ .......................... G06F 13/40; G06F 13/10
[52] U.S. Cl. .................. 395/282; 395/283; 340/619; 340/644; 340/634
[58] Field of Search .................. 395/282, 283; 307/125, 131; 340/825.57, 825.66, 825.89, 825.06, 634, 664, 644, 619

[56] References Cited

U.S. PATENT DOCUMENTS

| 4,217,492 | 8/1980 | Fayfield . | |
|---|---|---|---|
| 4,275,455 | 6/1981 | Bartlett | 395/750 |
| 4,356,393 | 10/1982 | Fayfield . | |
| 4,369,354 | 1/1983 | Goedecke et al. | 307/117 |
| 4,444,545 | 4/1984 | Sanders et al. | 307/118 |
| 4,744,103 | 5/1988 | Dahlquist et al. | 379/247 |
| 4,808,994 | 2/1989 | Riley . | |
| 4,982,107 | 1/1991 | Fayfield . | |
| 5,087,838 | 2/1992 | Fayfield . | |
| 5,103,111 | 4/1992 | Tobin et al. | 307/131 |
| 5,258,655 | 11/1993 | May et al. | 307/139 |
| 5,444,309 | 8/1995 | Innes et al. | 307/125 |
| 5,490,031 | 2/1996 | Braun et al. | 307/131 |
| 5,517,112 | 5/1996 | Vig et al. | 307/116 |

Primary Examiner—Jack B. Harvey
Assistant Examiner—Ario Etienne
Attorney, Agent, or Firm—Merchant, Gould, Smith, Edell, Welter & Schmidt, P.A.

[57] ABSTRACT

A binary sensor including a binary sensing circuit, a logic circuit and an adaptive interface card adapted to matingly engage the binary sensor. The binary sensing circuit and logic circuit are operatively coupled for communication with external circuits. The adaptive interface card includes bus network interface circuitry that disables the logic circuit and enables the bus network interface circuitry upon matingly engaging the interface card with the binary sensor. The bus network interface circuitry also becomes operatively coupled with the sensing circuit upon matingly engaging the adaptive interface card with the binary sensor. The bus network interface circuitry of the adaptive interface card provides a means for the binary sensor to communicate with bus networks. Each adaptive interface card includes one of a plurality of bus network circuits each having its own separate and distinct protocol which defines communication with at least one bus network having the same separate and distinct protocol as that of the bus network interface circuitry.

12 Claims, 4 Drawing Sheets

DUAL MODE BINARY SENSOR FOR BUS OPERATION

TECHNICAL FIELD OF THE INVENTION

The present invention relates to the field of binary sensors and specifically to the use of binary sensors in conjunction with industrial bus networks.

BACKGROUND OF THE INVENTION

Binary sensors are generally understood to be those sensing devices whose output exists in only one of two states, on or off (High or Low). The simplest example is a mechanical switch; other examples include but are not limited to photoelectric sensors, inductive proximity sensors, capacitive sensors, and ultrasonic sensors. Binary sensors are used in high quantities in factory automation, in most cases as input devices to Programmable Logic Controllers ("PLCs"). Typically, a binary sensor utilizes three wires to be connected to the PLC: positive supply voltage (+V), negative supply voltage (−V), and the sensor output signal (OUTPUT). In installations with large numbers of binary sensors, wiring costs and the PLC input port costs can be greater than the cost of the sensors themselves.

As a consequence, several data bus systems have been developed that permit binary sensors (and binary load such as solenoids) to operate over a single pair of datacom wires plus DC power, and to connect directly to the backplane of many PLC types. Examples of such data bus systems include Seriplex™ by Square D Company, ASI™ by Siemens, SDS™ by Microswitch, LON by Echelon and DeviceNet™ by Allen Bradley. Each of these systems has certain advantages over the others, and to date no single bus protocol for binary sensors has emerged. Thus customers and suppliers must find ways to operate with the above-mentioned buses each having its own distinctive protocol.

In order for a binary sensor to operate over a single pair of datacom wires, additional bus circuitry must be used in conjunction with the binary sensor. The additional circuitry provides a means for the binary sensor to be modified so that its communications protocol is compatible with that of the bus network system for communication. There are two philosophies regarding where to put the required bus network circuitry itself; one is that it should reside in the binary sensor, and the other is that it should reside in a separate junction box. The argument for placement of the bus circuitry inside the binary sensor is that there are already electronic circuits inside the sensor, and it does not add much to the overall cost of the sensor to add such extra circuitry for the bus interface. Accordingly, a binary sensor including the bus network circuitry would utilize a separate junction box that does not include or need the bus network interface circuitry. Such a junction box would merely comprise general interconnection circuitry.

On the other hand, each binary sensor manufacturer has thousands of different sensor models, and to include the required bus network interface circuitry in each binary sensor for each bus type would more than quadruple the size of the product line offering. Thus, a binary sensor that does not include the bus network interface circuitry would be used in conjunction with a junction box that includes such bus network interface circuitry. Inclusion of the bus network interface circuitry in the junction box would allow all permutations of the sensor types and bus types, and thereby cut down on the size of the product line offering. Because the cost of a junction box including bus network interface circuitry can be amortized over all of the inputs in a multiple input junction box, it is the least expensive approach when all junction box inputs are utilized. On the other hand, if the binary sensors are long distances from one another, as on a conveyor system, the multiple inputs negates the advantages of a bus system if wires from the sensors must be run long distances to the nearest junction box. In that situation, it is desireable to have the bus circuitry built into the sensor and to use junction boxes that do not include bus network interface circuitry.

The present invention overcomes the above difficulties by providing a method of easily accommodating both of the above described scenarios. It is a sensor that can be modified by a user to include bus network interface circuitry or adapted for use with a junction box including the bus network interface circuitry. The sensor can be further modified for communication with a number of different bus network systems, whichever network system a customer might select.

SUMMARY OF THE INVENTION

According to the present invention, there is provided a binary sensor comprising a binary sensing circuit having a means for receiving a signal indicative of a condition, a means for providing a signal representing the intensity of the signal received by the binary sensing circuit, and a means for detecting if the intensity of the signal is above or below a threshold value. The binary sensor further comprises a logic circuit operatively coupled to the binary sensing circuit for providing a means for communicating with an external circuit. The external circuit may be any of a number of different circuit types, including a relay, a programmable logic control, or a logic-level load. The binary sensor further comprises an adaptive interface card, including bus network interface circuitry that is operatively coupled to the binary sensing circuit and the logic circuit when the adaptive interface card is matingly engaged with receiving connectors within the binary sensor. The adaptive interface card provides a means for the sensor to communicate with a bus network system, and precludes the use of external circuitry to provide communications protocol for use with a bus network system. The adaptive interface card also disables the logic circuit and enables the bus network interface circuitry within the card. If the adaptive interface card is not engaged, the sensor communicates with a bus network system through engagement of external circuitry, such as a junction box that includes bus network interface circuitry. The junction box is coupled to the bus network and has the protocol that provides a means for the binary sensing circuit and the logic circuit to communicate with the network bus.

BRIEF DESCRIPTION OF THE DRAWINGS

In the drawings, wherein like reference letters and numerals designate corresponding elements throughout the several views.

GENERAL DESCRIPTION

Figure 1:
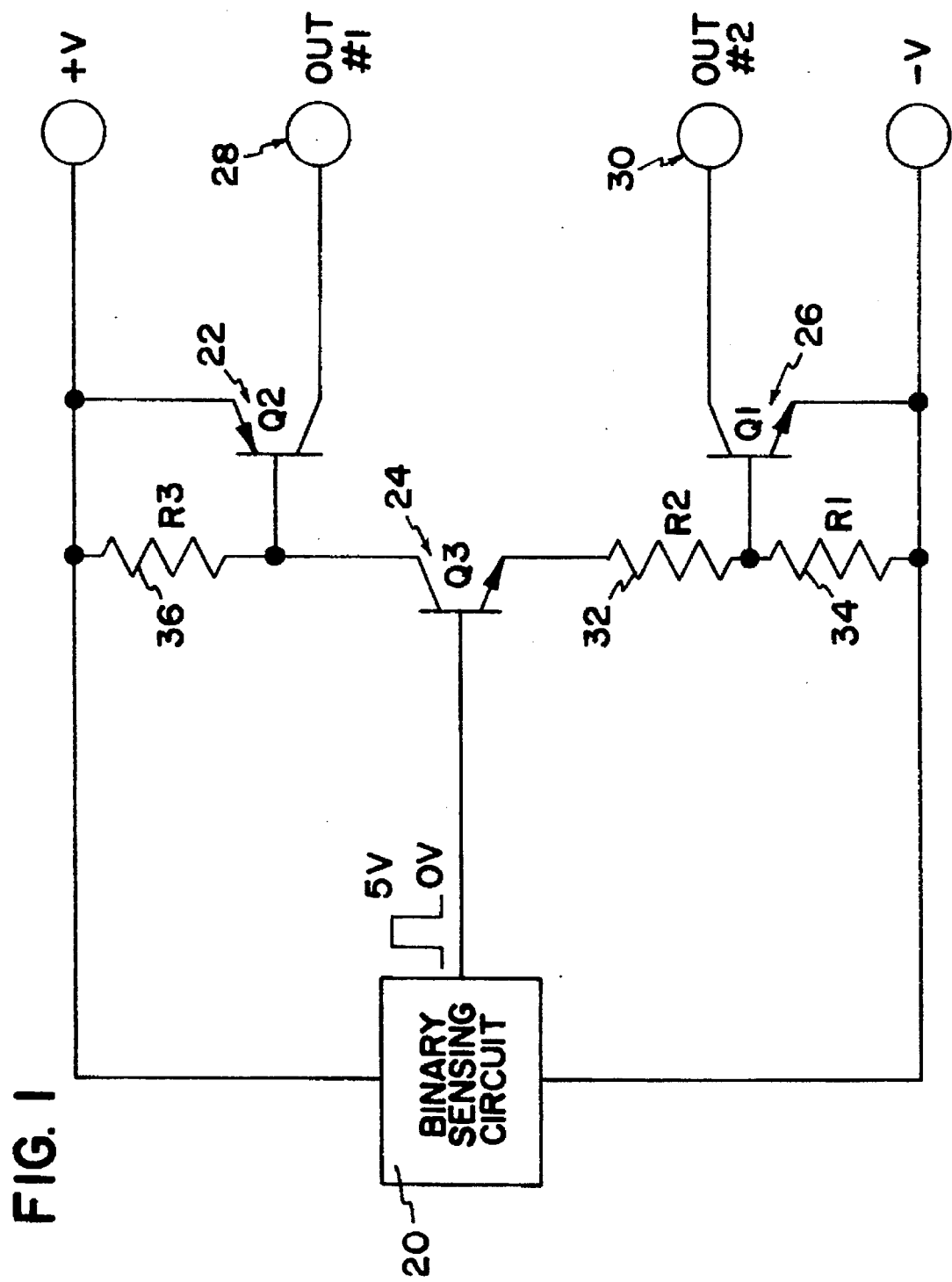
FIG. 1 is a schematic electrical diagram of the binary sensor that does not have circuitry providing network bus communications protocol.

Referring to FIG. 1, the present invention is a binary sensor having the adaptive capability to communicate with a network bus. The adaptive capabilities of the present invention allows a customer to select or alter not only the bus network type, but also to elect to have the bus electronics in the binary sensor or in a junction box.

The present invention is a sensor that can be used with a junction box including bus network interface circuitry, or used with a junction box that does not include bus network interface circuitry. The present invention may also be used with other simple external circuits such as relays, solenoids, logic-level loads and other external circuits that become operative by way of a signal being above or below a threshold value.

By the addition, in the field, of a bus network interface card specific to the chosen bus network type, a customer does not have to choose either the bus network type or the junction box type at the time the binary sensor is ordered. The bus network interface bus card also relieves pressures on sensor manufacturers, by not forcing them to build and stock binary sensors having network bus protocol and specifications compatible for every bus type.

The bus network interface cards are small printed circuit boards that carry the bus network interface electronics. The bus cards plugs into the sensors in the same way plug-in timing cards are now used with sensors, as is well known in the art.

DETAILED DESCRIPTION OF SPECIFIC EMBODIMENT

In the following detailed description of the preferred embodiment, reference is made to the accompanying drawings which form a part hereof and in which is shown by way of illustration an exemplary embodiment and a description having sufficient detail to enable those skilled in the art to practice the invention.

Figure 2:
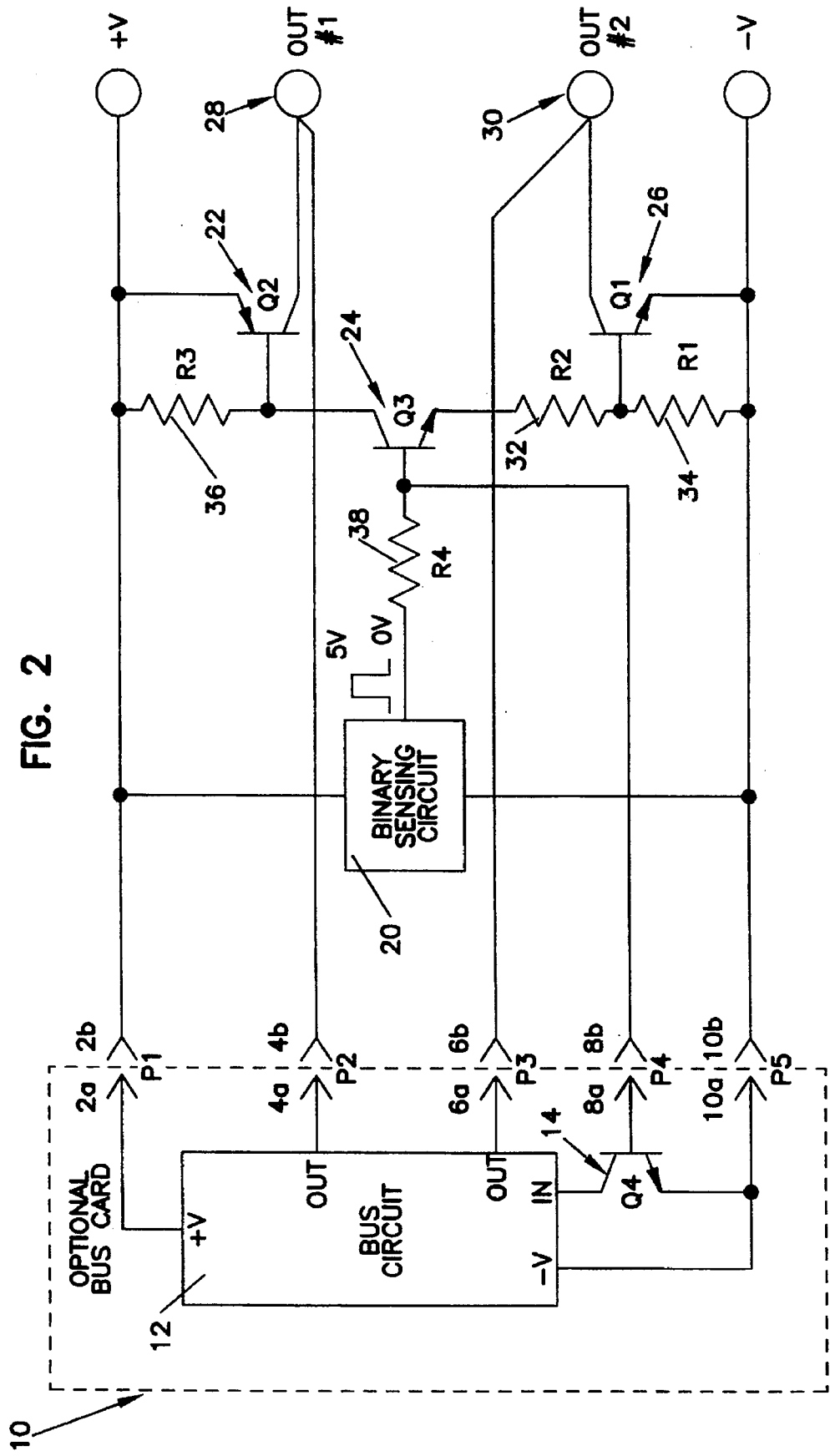
FIG. 2 is a schematic electrical diagram of the binary sensor illustrating the optional bus card binary sensing circuit and logic circuit.

Referring now to FIG. 1, the circuitry of the typical configuration of a binary sensor is shown. In FIG. 2, the binary sensor includes an interface card 10, that may be coupled to the circuitry of the typical configuration of a binary sensor, which includes a binary sensing circuit 20 and a logic circuit. The interface card 10 comprises bus network interface circuitry 12 and a transistor 14 that provides an input signal to the bus network interface circuitry. The bus network interface circuitry is within bus network chip 12. The bus network interface circuitry provides a means for the binary sensor 20 to communicate with a bus network of the user's choice. The bus network interface circuitry is determined by the bus network type chosen. The bus network interface circuitry is embodied in bus network chips that are commercially available for use and well known in the art. Examples of such chips include; Motorola No. MC68HC05X4 processor chip and Phillips No. 82C250 interface chip for use with a CANBus (Device Net™ and SDS™); a Square D No. SPX2-SP256-2A for use with a Seriplex™ bus network; a AMS No. 3470-0001 for use with a ASI™ bus network; or a Motorola No. MC143150FU or No. MC143120DW for use with a Echelon ("LON") bus network.

Referring to FIG. 1, the circuit shows a typical configuration of a binary sensor that is well known to those of ordinary skill in the art. The binary sensor is comprised of the binary sensing circuit 20 and three transistors 22, 24 and 26. One of the transistors 24 acts as a driver to the two output transistors 22 and 26. Output transistors 22 and 26 have their emitters connected to two separate sources of operating potential indicated by the symbols +V and −V. The operating potential ranges typically from 10 to 30 volts DC. Output lead 28 is a sourcing output from the collector of sourcing output transistor 22. Sourcing output transistor 22 is typically a PNP transistor which provides a positive voltage output ("HIGH") when the binary sensor is actuated. Sinking output lead 30 is connected to the collector of sinking output transistor 26, typically an NPN transistor which provides a low level output ("LOW") when the sensor is actuated.

In another embodiment of the invention, sinking output transistor 26 and sourcing output transistor 22 could be replaced with FETs (Field Effect Transistors) (not shown) as is well known in the art.

The driver transistor 24 provides base current for both the sinking and sourcing output transistors 22 and 26 when the base of the driver transistor 24 is held high. The current supplied by driver transistor 24 is a function of the voltage output from the binary sensing circuit 20 and the value of resistor 32 connected to the emitter of driver transistor 24, since the driver transistor 24 is acting as a voltage follower. Resister 34 serves to prevent leakage current from operating sinking output transistor 26 and resistor 36 serves to prevent leakage current from operating sourcing output transistor 22. As a result of this configuration when the output of binary sensing circuit 20 goes high, both sinking and sourcing output transistors 22 and 26 conduct. Typically, in operation of the binary sensor only one of the outputs at leads 28 and 30 is used. However, both may be used simultaneously if desired.

Generally, the signal output of the binary sensor is a signal indicative of a condition at a high or low state. This signal is used for driving simple loads such as relays, solenoids, logic-level loads and inputs to programmable logic controllers. Accordingly, when the binary sensing circuit of the binary sensor receives a signal indicative of a condition, the binary signal produced represents whether the intensity of the signal is above or below a threshold value. Coupling the binary sensor, shown in FIG. 1, for communication on a network bus is done through a junction box (not shown) that includes bus network interface circuitry. The junction box receives the signal output of the binary sensor and modifies the signal so that it is at bus network protocol. The user can select one of the two outputs at leads 28 and 30 to be connected to the junction box depending on the input requirements of the junction box.

Referring now to FIG. 2, the same binary sensing circuit 20 and output transistors 22, 24 and 26 of FIG. 1 are shown. The binary sensor has been modified to include a five pin connector 2b, 4b, 6b, 8b, and 10b and a resistor 38 that is connected in series with the base of driver transistor 24. The addition of the five pin connector (2b, 4b, 6b, 8, and 10b) and resistor 38 will not alter operation of the binary sensor's sinking and sourcing output transistors 22 and 26 from the manner described above. The addition of the five pin connector and the resistor 38 provides the means for the addition of an optional bus card 10 (shown in the dash lines) that causes the sensor outputs at leads 28 and 30 to provide a signal capable of communicating on a bus network system. The communications protocol upon which the binary sensor of FIG. 2 operates is determined by the bus network circuitry within bus network interface card 10.

Engagement of the bus network interface card 10 into connectors 2b, 4b, 6b, 8b and 10b, causes sinking and sourcing output transistors 22 and 26 to be disabled. Disabling the sinking and sourcing output transistors 22 and 26 essentially removes these transistors from operation within the binary sensor. This occurs because the base of drive transistor 24 cannot rise in voltage any higher than one base-emitter drop (about 0.55 volts), the voltage drop of disabling transistor 14. Resistor 38 limits the current flowing into the base of disabling transistor 14. Resistors 34 and 38 are chosen at a value so that, in order for the sinking and sourcing output transistors 22 and 36 to conduct, the base of drive transistor 24 would have to rise well above 0.55 volts. The disabling transistor 14 also provides the input signal to the bus chip 12. With sinking and sourcing output transistors 22 and 26 disabled, the outputs of the interface cards 4a and 6a can directly operate on the output leads of the binary sensor, 28 and 30. After the interface card engages the binary sensor, the binary sensor takes on the specific protocol determined by the bus chip inserted into the bus network interface card. Accordingly, a user can engage any network bus with the same binary sensor upon engagement of an interface card having the appropriate network interface circuitry.

Figure 3:
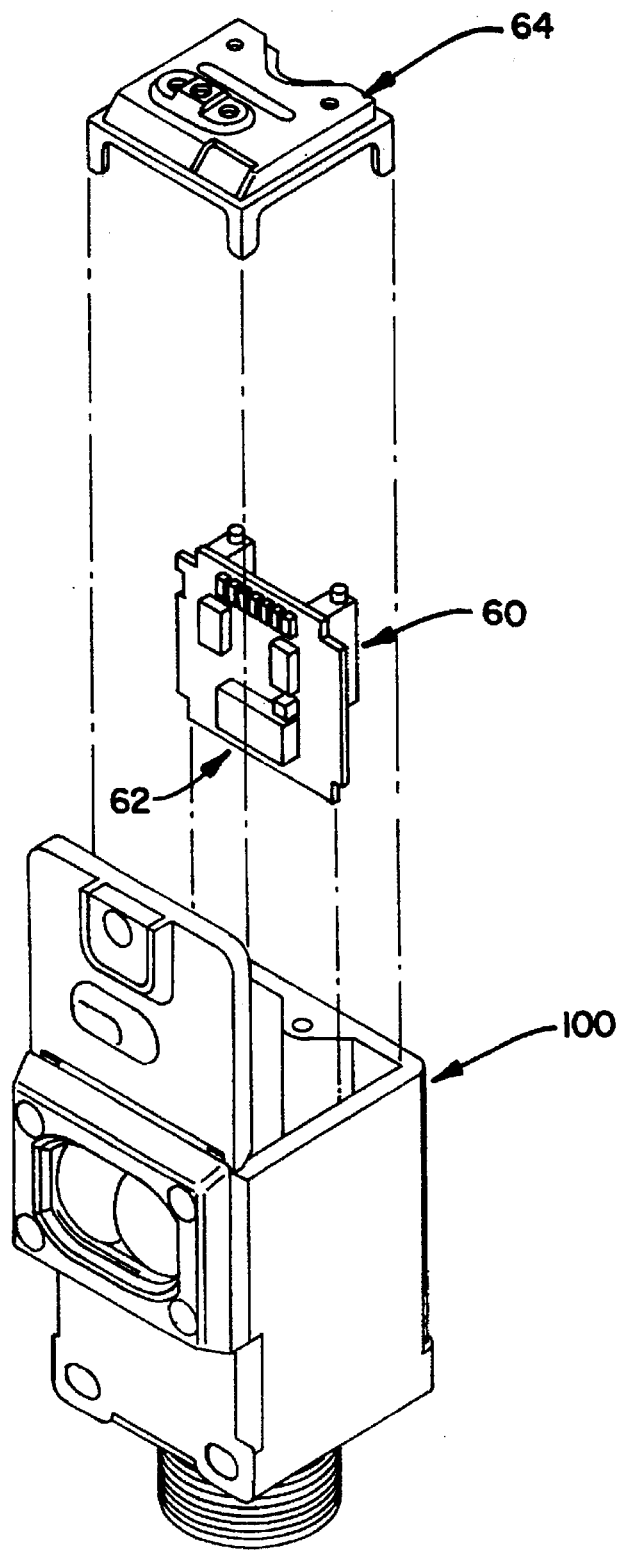
FIG. 3 is a view of a sensor illustrating an adaptive interface card.

FIG. 3 is illustrative of the binary sensor 1 and the engagement of the adaptive bus network interface card 60 into the binary sensor 1. The adaptive interface card 60 is a circuit board including a bus network chip 62 and additional circuitry that modifies the protocol of the binary sensor 1 to allow the binary sensor 1 to communicate with a network bus.

Figure 4:
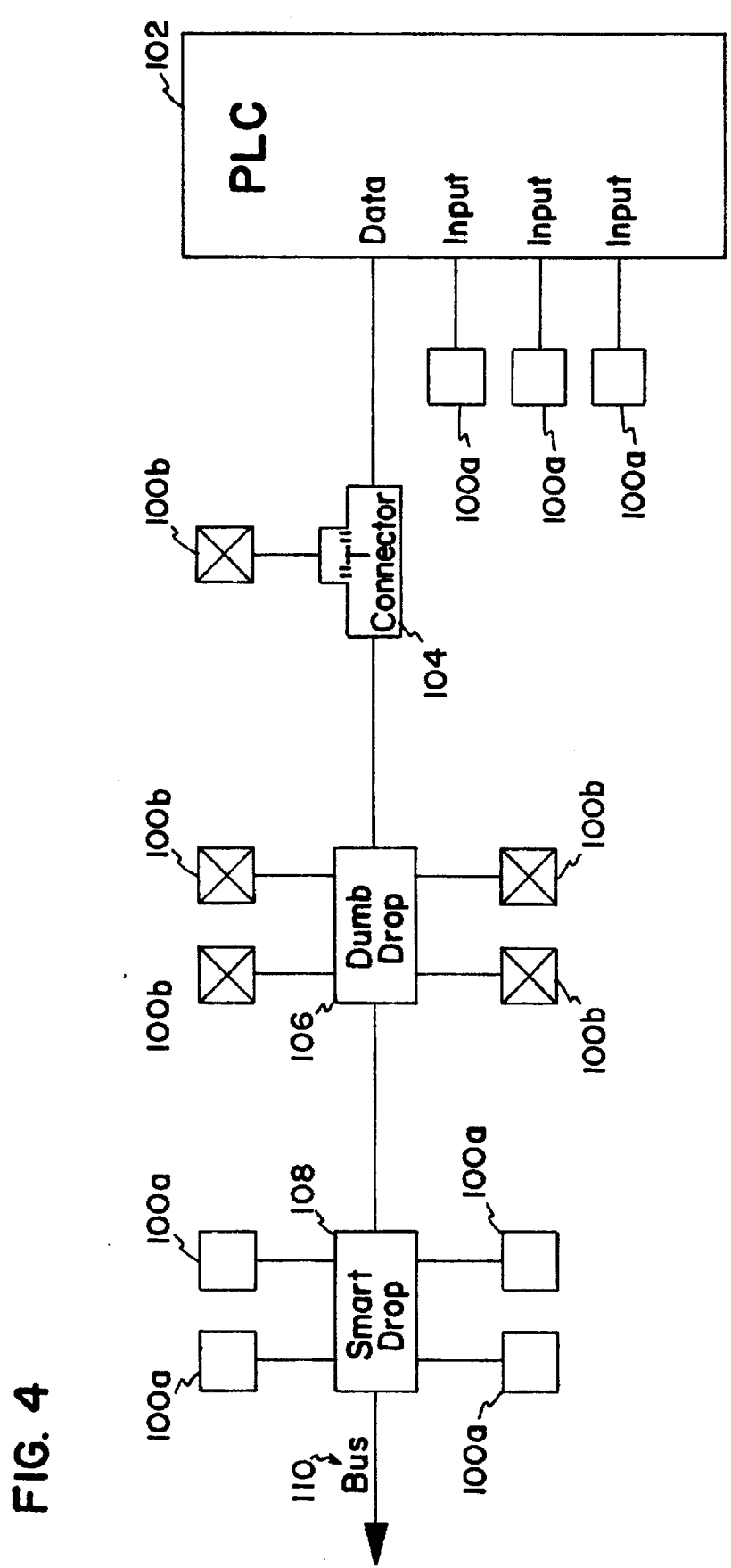
FIG. 4 is a block diagram illustrating the use of sensors on a network bus, where the sensors illustrated are with and without the adaptive network bus interface card.

FIG. 4 is illustrative of a binary sensor 100 and its use without the adaptive interface card 100a and its use with the adaptive interface card 100b.

As previously explained, the binary sensor 100 that does not include the adaptive interface card 100a provides a simple binary output indicative of a condition that is above or below a threshold level. That signal may be communicated directly to the PLC 102 when the binary sensor and PLC are directly coupled in the manner shown in FIG. 4. Because the binary sensor 100a can communicate directly with the programmable logic controller, no protocol conversion circuitry or adaptive interface card is necessary. On the other hand, where each binary sensor 100 is not connected directly to the programmable logic controller and the data representative of the signal output by the binary sensor is communicated to the programmable logic controller via a data bus, the signal output of the binary sensor must be modified so that it is at bus network protocol. One method of achieving bus network protocol is to engage the adaptive interface card 60 with the binary sensor 100b. Where the use of a single binary sensor 100b including the adaptive interface card 60 is desired to be connected to the network bus 100, a simple T-connector 104 could be used. Where there are multiple binary sensors 100b including the adaptive interface card that must be attached to the network bus 110, they may be connected through junction boxes having multiple inputs allowing communication on the network bus 110. On the other hand, where there are multiple binary sensors 100a that do not include the adaptive interface card 60 and connection to the network bus is desired, a junction box 108 including the network interface circuitry can be used to allow the binary sensors 100a to communicate on the network bus 110.

What is claimed:

1. A binary sensor comprising:
   a binary sensing circuit having a means for receiving a signal indicative of a condition; and a means for producing a binary signal indicative of whether the intensity of said signal is above or below a threshold;
   a logic circuit, operatively coupled to said binary sensing circuit, for providing a means for communicating with a first external circuit;
   an adaptive interface card, including bus network interface circuitry, operatively coupled to said binary sensing circuit and said logic circuit;
   wherein said adaptive interface card disables said logic circuit and enables said bus network interface circuitry upon insertion into said binary sensor,
   said adaptive interface card providing a means for said binary sensor to communicate with a first network bus and network buses of a type other than said first network bus without the use of said first external circuit.

2. A binary sensor as defined in claim 1 wherein said first external circuit is a relay.

3. A binary sensor as defined in claim 1 wherein said first external circuit is a solenoid.

4. A binary sensor as defined in claim 1 wherein said first external circuit is a programmable logic control.

5. A binary sensor as defined in claim 1 wherein said first external circuit is a logic level load.

6. A binary sensor as defined in claim 1 wherein said first external circuit, comprising circuitry compatible for communication with said first network bus, is coupled to said first network bus for providing a means for said binary sensing circuit and said logic circuit to communicate with said first network bus.

7. A binary sensor as defined in claim 1 wherein said logic circuit includes an output transistor and a drive transistor; said drive transistor providing current to said output transistor.

8. A logic circuit as defined in claim 7 wherein said logic circuit includes a sourcing output transistor and a sinking output transistor.

9. A binary sensor as defined in claim 1 wherein said adaptive interface card comprises said bus network interface circuitry and a transistor, said transistor providing an input signal to said bus network interface circuitry, while simultaneously disabling said logic circuit.

10. A binary sensor as defined in claim 1 wherein said first external circuit comprises circuitry that provides a means for said binary sensor to communicate with said first network bus.

11. An adaptive interface for use with a binary sensor comprising a binary sensing circuit and a logic circuit, wherein the binary sensing circuit and logic circuit are operatively coupled, the adaptive interface comprising:
   an interface card adapted to matingly engage the binary sensor,
   said interface card including a bus network circuit;
   said interface card disabling the logic circuit and enabling said bus network circuit upon engagement of said interface card,
   said bus network circuit becoming operatively coupled with said binary sensing circuit upon engagement of said interface card,
   said bus network circuit providing a communication means for the binary sensor to communicate with at least one of a plurality of bus networks.

12. An adaptive interface as defined in claim 11 wherein each of a plurality of said adaptive interface card includes one of a plurality of different bus network circuits, wherein each said bus network circuit is distinct and defines protocol for communication with at least one of said plurality of bus networks, wherein each of said plurality of bus networks has distinct protocol.

* * * * *